Oct. 21, 1947.  H. A. REINHARDT  2,429,486
PUNCHED FELT FLOOR COVERING AND PROCESS OF MAKING THE SAME
Filed Dec. 23, 1944
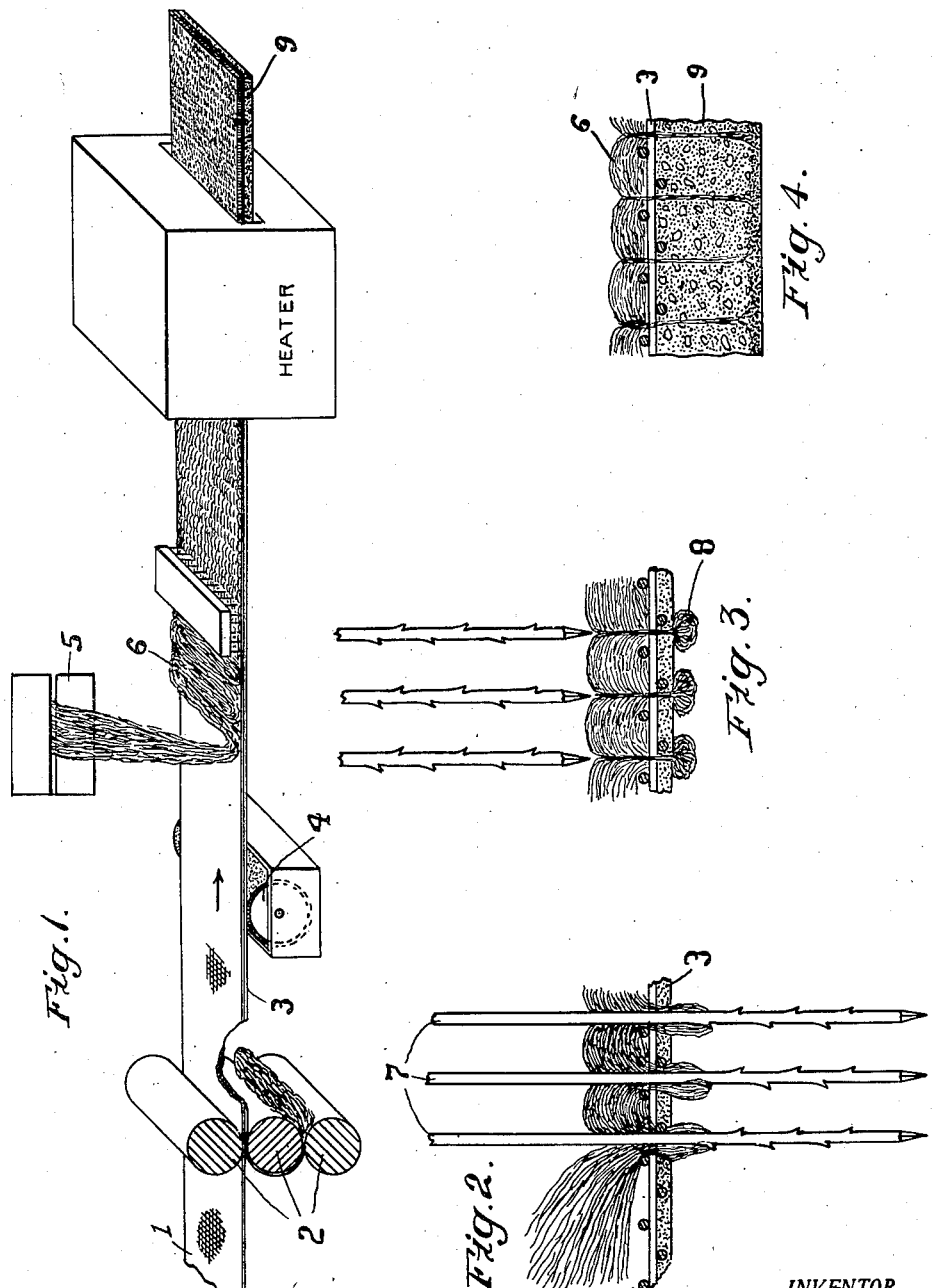
INVENTOR.
Henry A. Reinhardt
Rowland V. Patrick
BY Patented Oct. 21, 1947

2,429,486

UNITED STATES PATENT OFFICE 2,429,486

PUNCHED FELT FLOOR COVERING AND PROCESS OF MAKING THE SAME

Henry A. Reinhardt, Longmeadow, Mass., assignor to Bigelow-Sanford Carpet Co., Inc., Thompsonville, Conn., a corporation of Massachusetts Application December 23, 1944, Serial No. 569,497

6 Claims. (Cl. 154—49)

My invention relates to a punched felt floor covering and the process of making the same.

The object of the invention is to produce such a floor covering which will be of enhanced resiliency and provide an improved cushion effect.

The floor covering of my invention consists of a burlap, or similar open weave fabric, to the bottom of which is secured a swollen sponge thermosetting compound, preferably vulcanized rubber, adhering to the fabric. On the upper side of the fabric is a layer or mat of unwoven fibers, parts of which are punched through the fabric and are contained in the sponge compound on the back by which the fibers are firmly held due to the swelling of the compound.

Fig. 1 is a diagram of the process as a whole; and Figs. 2, 3 and 4 illustrate successive effects of some of the operations on the material.

The following is the preferred method of producing the floor covering embodying vulcanized sponge rubber as the sponge compound on the back.

Referring to Fig. 1, the sheet of burlap 1, or similar fabric, is passed between calender rolls 2 and receives a film of the milled rubber compound 3 which adheres to and impregnates the burlap.

This compound is a vulcanizable sponge rubber compound. It preferably is made as follows, the parts being given by weight: 25 parts of pale crepe and 150 parts of sponge type reclaim rubber are milled for 35 minutes in a cold rubber mill. At the end of 20 minutes of milling, one part of an anti-oxidant, such as Age-Rite Resin D, is added. After 35 minutes of milling the following are added:

| | Parts |
|---|---|
| An accelerator activator, such as zinc oxide | 4 |
| A vulcanizing agent, such as sulphur | 3 |
| An accelerator, such as Altax | 1.25 |
| An accelerator, such as Zimate | 0.125 |
| An activator of the accelerator and a softener, such as stearic acid | 10 |
| A rubber softener, such as Plastogen | 30 |
| Bicarbonate of soda | 5 |

Age-Rite Resin D is a trade name for a polymerized trimethyl dihydroquinoline. Altax is a trade name for a semi-ultra accelerator comprising benzothiazyl disulfide. Zimate is a trade name for an accelerator comprising zinc dibutyldithiocarbamate. Plastogen is a trade name for a rubber softener comprising about 98% of mineral oil, 1.6% of a sulfonated petroleum product and about 0.4% of normal butyl alcohol.

These materials are thoroughly stirred, mixed together and milled to form the sponging compound which is plastic in nature.

This compound is fed to the nip between the two lower calender rolls, Fig. 1, and is applied to the bottom of the burlap in a film 3 about 0.022 inch thick, the equivalent of about 1 pound per square yard. Under the pressure of the rolls the compound impregnates and adheres to the fabric.

The burlap with the rubber compound on the bottom may be passed over a roll 4 which applies talc to the surface of the rubber compound. Fibers of any suitable sort, wool, cotton, etc., or synthetic fibers, from a garnetting machine 5 are laid and distributed in a mat 6 over the top surface of the burlap and are needled punched through the burlap and the rubber compound by the needles 7 of the well-known needling machine, Fig. 2. The rubber compound 3 on the bottom of the burlap serves to choke the holes made by the needles. It grips the fibers and facilitates the stripping of the fibers from the needles when the needles are withdrawn, Fig. 3. The withdrawal of the needles leaves bunches of fiber portions 8 on the bottom film.

The needled material is passed into a heater, such as a hot air drier, Fig. 1, in which it is heated to 280 to 300° F. for about 20 minutes. One effect of this treatment is to break down the bicarbonate of soda and release the carbon dioxide gas which causes the compound to form sponge rubber 9 which swells through, around and to the outside of the parts of the fibers extruding on the bottom of the fabric thereby burying those fiber parts in the sponge rubber and holding them firmly in place, Fig. 4. The heat also causes the rubber compound to become thoroughly vulcanized.

The swollen vulcanized sponge rubber on the bottom of completed articles not only holds the fiber securely in place but it provides a cushion of the desired thickness so that the material has a soft and resilient feel when used as a floor covering.

Although vulcanized sponge rubber is preferred as the backing compound, other compounds, such as synthetic resins, including Vinylite, which when heated become swollen, set, and spongelike, may be substituted for rubber as the sponge backing.

I claim:

1. The process of making a needled felt floor covering material which comprises applying to one side of an open weave fabric a vulcanizable rubber compound capable of swelling when heated, applying a mat of unwoven fibers to the other side of said fabric, then punching some of said fibers through said fabric and through said compound, and thereafter heating said rubber compound to cause it to swell and to be vulcanized in swollen condition.

2. The process of making a needled felt floor covering material which comprises applying to one side of an open weave fabric a layer of a thermosetting plastic composition capable of swelling to a sponge-like condition when heated, applying a mat of unwoven fibers to the other side of said fabric, then punching some of said fibers through said fabric and through said layer, said thereafter heating said composition to cause the same to swell and to draw with it the fibers which have penetrated through said layer and to set said composition in a swollen sponge-like condition.

3. The method of making a needled felt floor covering which comprises applying to one side of an open weave fabric a layer of a thermosetting plastic composition capable of expanding when heated, applying to the other side of said fabric a layer of matted unwoven fibers, then needling some of said fibers through said fabric and through said composition, and thereafter heating said plastic composition to cause it to swell and draw the parts of the fibers embedded therein toward the back of the swollen composition.

4. The method of making a needled felt floor covering which comprises applying to one side of an open weave fabric a layer of a solid plastic composition, applying to the other side of said fabric a layer of matted unwoven fibers, needling some of said fibers through said fabric and through said compound and stripping the fibers from the needles by the grip of the compound as the needles are retracted.

5. A needled punched felt floor covering comprising an open weave fabric, a mat of unwoven fibers on one side of said fabric and a backing layer of vulcanized swollen sponge rubber at least twice as thick as said mat adhering to the other side of said fabric, many of said fibers forming U-shaped loops both legs of which penetrate through said fabric and into said backing to distances greater than the thickness of the combined open weave fabric and said mat.

6. A needled punched felt floor covering material comprising an open weave fabric, a backing layer of vulcanized swollen sponge rubber on one side of said fabric and a facing layer of matted unwoven fibers on the other side of said fabric, many of said fibers forming U-shaped loops both legs of which extend through the fabric and into said backing layer, said loops having bights which straddle and tightly hold said fibers down against said open weave fabric.

HENRY A. REINHARDT.

REFERENCES CITED

The following references are of record in the file of this patent:

UNITED STATES PATENTS

| Number | Name | Date |
|---|---|---|
| 1,703,636 | Rasch | Feb. 26, 1929 |
| 1,865,345 | Wheatley | June 28, 1932 |
| 1,887,979 | Levin | Nov. 15, 1932 |